US011311980B2

(12) United States Patent
Studt et al.

(10) Patent No.: US 11,311,980 B2
(45) Date of Patent: Apr. 26, 2022

(54) MACHINED POP UP SEAL

(71) Applicant: Graco Minnesota Inc., Minneapolis, MN (US)

(72) Inventors: Nicholas K. Studt, Roberts, WI (US); Bryce J. Gapinski, Foley, MN (US); Brandon K. Falkenberg, New Richmond, WI (US); John W. Turner, Coon Rapids, MN (US)

(73) Assignee: Graco Minnesota Inc., Minneapolis, MN (US)

( * ) Notice: Subject to any disclaimer, the term of this patent is extended or adjusted under 35 U.S.C. 154(b) by 876 days.

(21) Appl. No.: 16/065,528

(22) PCT Filed: Feb. 28, 2017

(86) PCT No.: PCT/US2017/019820
§ 371 (c)(1),
(2) Date: Jun. 22, 2018

(87) PCT Pub. No.: WO2017/151541
PCT Pub. Date: Sep. 8, 2017

(65) Prior Publication Data
US 2021/0205957 A1 Jul. 8, 2021

Related U.S. Application Data

(60) Provisional application No. 62/301,060, filed on Feb. 29, 2016.

(51) Int. Cl.
*B24C 7/00* (2006.01)
*F16K 1/36* (2006.01)
(Continued)

(52) U.S. Cl.
CPC .............. *B24C 7/0038* (2013.01); *F16K 1/36* (2013.01); *F16K 1/306* (2013.01); *F16K 25/005* (2013.01)

(58) Field of Classification Search
CPC ... B24C 7/0038; B24C 7/0023; B24C 7/0015; B24C 7/0007; B24C 7/00; B24C 7/0061;
(Continued)

(56) References Cited

U.S. PATENT DOCUMENTS 3,089,285 A * 5/1963 Moore .................. B24C 7/0046
451/2
3,270,463 A * 9/1966 Ashworth ................. B24C 9/00
451/2

(Continued)

FOREIGN PATENT DOCUMENTS

WO 2015042032 A1 3/2015

OTHER PUBLICATIONS

International Search Report and Written Opinion of PCT Application Serial No. PCT/US2017/019820, Filed Feb. 28, 2017, 10 Pages.

*Primary Examiner* — David Colon-Morales
(74) *Attorney, Agent, or Firm* — Kinney & Lange, P.A.

(57) ABSTRACT

A vapor blast system includes a pressure pot with an upper end and a main body, a fill inlet attached to the upper end of the pressure pot, and a seal assembly disposed in the pressure pot. The seal assembly is configured to control a flow of a fluid between the pressure pot and the fill inlet. The seal assembly includes a pop-up seal, a pipe, and a spring. The pop-up seal comprises an upper surface, a lower surface disposed opposite the upper surface, a blind hole disposed in the upper surface, a bore disposed in the lower surface, and a centerline axis disposed through a center of the pop-up seal. The pipe is attached to a lower surface of the pop-up seal, wherein a portion of the pipe is received by the bore. The spring is disposed in the bore and engaged with the pipe.

19 Claims, 6 Drawing Sheets

(51) Int. Cl.
*F16K 1/30* (2006.01)
*F16K 25/00* (2006.01)

(58) Field of Classification Search
CPC ... B24C 7/0053; B24C 7/0076; B24C 7/0046; B24C 7/0084; F16K 1/12; F16K 1/306; F16K 1/303; F16K 1/38; F16K 1/36; F16K 1/34; F16K 25/005
See application file for complete search history.

(56) References Cited

U.S. PATENT DOCUMENTS

| | | | | |
|---|---|---|---|---|
| 3,521,407 | A * | 7/1970 | Nalley | B24C 7/00 451/2 |
| 4,557,825 | A * | 12/1985 | Wittes | B07B 1/00 141/114 |
| 5,195,280 | A * | 3/1993 | Nicholson | B05B 7/1436 451/101 |
| 5,433,653 | A | 7/1995 | Friess | |
| 5,556,325 | A * | 9/1996 | Shank, Jr. | B24C 1/003 451/100 |
| 2002/0137005 | A1 | 9/2002 | Cevey et al. | |
| 2003/0224704 | A1 | 12/2003 | Shank | |
| 2006/0037293 | A1 * | 2/2006 | Storer | B24C 7/0046 55/410 |
| 2011/0011468 | A1 * | 1/2011 | Nguyen | F16K 15/044 137/513.7 |
| 2012/0015592 | A1 * | 1/2012 | Eliason | B24C 7/0038 451/91 |
| 2013/0072094 | A1 * | 3/2013 | Eliason | B24C 7/0007 451/75 |
| 2016/0193715 | A1 * | 7/2016 | Nash | B24C 7/0084 451/99 |
| 2017/0334037 | A1 * | 11/2017 | McIntyre | B24C 9/00 |

\* cited by examiner

MACHINED POP UP SEAL

CROSS-REFERENCE TO RELATED APPLICATION

This application claims priority to U.S. Provisional Application No. 62/301,060 filed on Feb. 29, 2016, and entitled "MACHINED POP UP SEAL," the entire contents of which are hereby incorporated by reference in their entirety.

BACKGROUND

The present disclosure relates to abrasive blasting systems, and more particularly, to a pop-up seal for an abrasive blasting system.

Blasting systems in the surface preparation industry generally use dry, wet, slurry, vapor abrasive, or ultra-high pressure water blast technologies to remove dirt, paint, or rust from a substrate. Vapor blast systems use a mixture of air, water, and an abrasive media—such as garnet—to provide the desired surface treatment. Vapor blast systems often include a pump and a pressure vessel containing an abrasive blast media having a density greater than water. Pumping water to the pressure pot pressurizes it and allows abrasive blast media and water to mix. The pressurized blast media and water mixture is then plumbed into a conduit of a high flowing air stream to mix the two streams before expelling the mixture from a hose and blast nozzle.

In vapor abrasive blasting systems, it is important that the pressure pot of the blasting system be purged of air prior to commencement of the blasting operation. Pressurized water forces a slurry out of the pressure pot, into a piping system, and finally into a mixing point where the wet slurry is mixed with compressed air. Fluctuations in flow of pressure in either the slurry or pressurized gas result in inconsistent behavior of the vapor abrasive blasting system and ultimately lead to an uncontrollable or inefficient blasting process. Air entrapment underneath a pop-up seal of the pressure pot or pressure vessel is a contributing factor to instability of vapor abrasive blasting systems. Existing pop-up seals are cast which have pockets that trap air and can cause rust to form. Presence of through holes in existing pop-up seals causes fluid leaks through the seal.

SUMMARY

A vapor blast system includes a pressure pot with an upper end and a main body, a fill inlet attached to the upper end of the pressure pot, and a seal assembly disposed in the pressure pot. The seal assembly is configured to control a flow of a fluid between the pressure pot and the fill inlet. The seal assembly includes a pop-up seal, a pipe, and a spring. The pop-up seal comprises an upper surface, a lower surface disposed opposite the upper surface, a blind hole disposed in the upper surface, a bore disposed in the lower surface, and a centerline axis disposed through a center of the pop-up seal. The pipe is attached to a lower surface of the pop-up seal, wherein a portion of the pipe is received by the bore. The spring is disposed in the bore and engaged with the pipe.

A method of making a seal assembly for use in a pressure pot of a vapor deposition system includes machining a pop-up seal. The pop-up seal includes a centerline axis, a body, a blind hole, an upper surface, and a lower surface. The blind hole is disposed in the body and includes a cutout. The upper surface includes a first radially inner portion comprising a first average slope relative to the centerline axis of the pop-up seal and a second radially outer portion comprising a second average slope relative to the centerline axis of the pop-up seal. The second average slope is greater than the first average slope. The lower surface includes a frustoconical configuration with an upward slope relative to the centerline axis of the pop-up seal. The upper surface of the pop-up seal is coated with a rubber coating.

A seal assembly includes a pop-up seal (formed of machined aluminum, brass, or steel), a rubber coating, a pipe attached to the pop-up seal, and a spring. The pop-up seal includes a body, an upper surface, a lower surface disposed opposite the upper surface, a blind hole disposed in the upper surface, a bore disposed in the lower surface, and a centerline axis disposed through a center of the pop-up seal. The blind hole includes a cutout extending into a portion of the pop-up seal. The rubber coating is disposed on the upper surface of the pop-up seal. A portion of the pipe extends into the bore. The spring is disposed in the bore and is engaged with the pipe.

DETAILED DESCRIPTION

Figure 1:
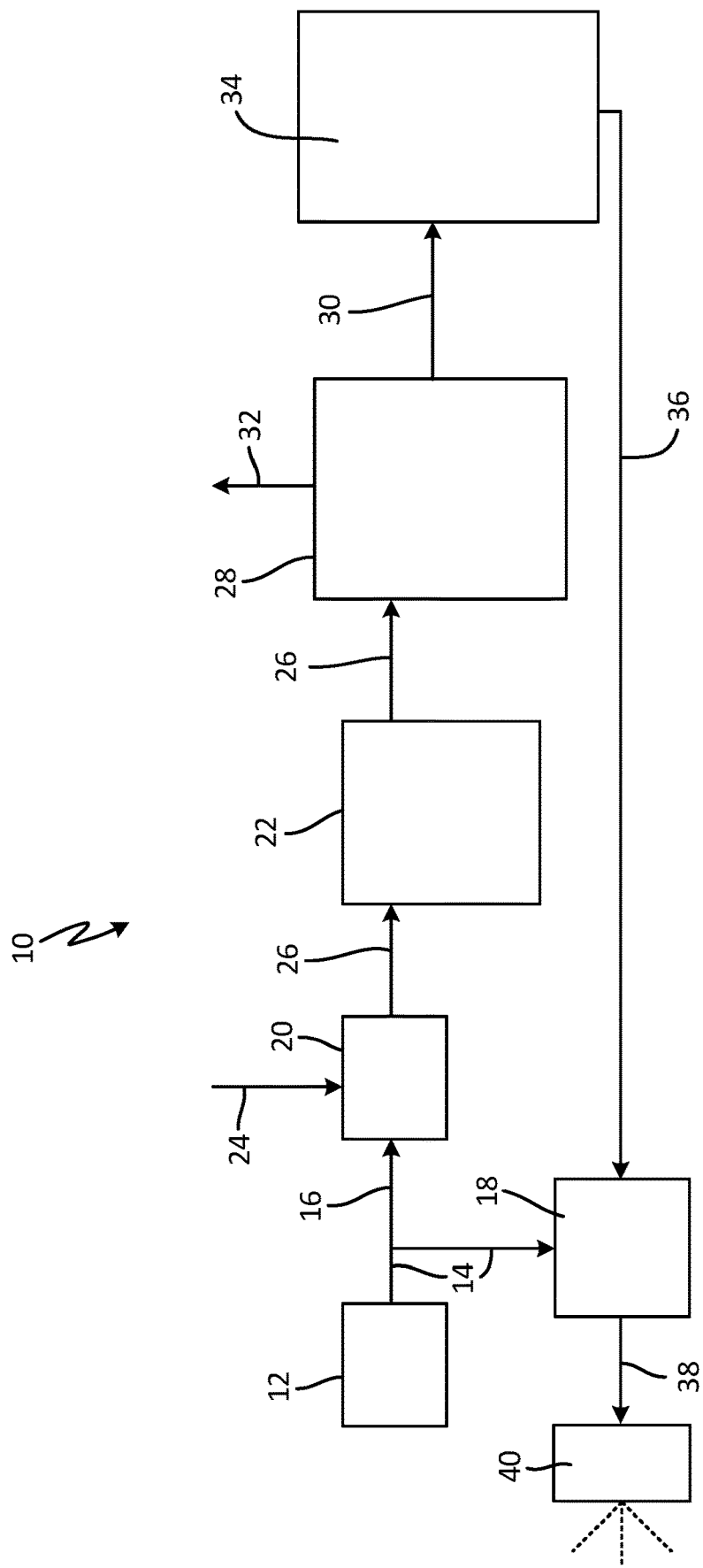
FIG. 1 is a schematic view of a vapor blast system.

FIG. 1 shows a schematic view of vapor blast system 10. Vapor blast system 10 includes compressor 12, air supply line 14, system line 16, manifold 18, water pump 20, water regulator 22, water inlet line 24, pumped water lines 26A and 26B, selector valve 28, pressurizing line 30, accessory line 32, pressure vessel 34, media line 36, blast line 38, and applicator 40.

Vapor blast system 10 is a vapor abrasive blast system for coating removal and surface preparation. Compressor 12 is a device for compressing a fluid. Air supply line 14 and system line 16 are hoses or conduits configured for transfer of a fluid such as air and/or water. Manifold 18 is a cube-shaped box or case. Water pump 20 is a device for pumping water. Water regulator 22 is a device for regulating water. Water inlet line 24 and pumped water lines 26A and 26B are hoses or conduits configured for transfer of a fluid such as air and/or water. Selector valve 28 is a valve for directing and/or controlling a flow of a fluid. Pressurizing line 30 and accessory line 32 are hoses or conduits configured for transfer of a fluid such as air and/or water. Pressure vessel 34 is a container for containing a blast mixture. Media line 36 and blast line 38 are hoses or conduits configured for transfer of a fluid such as air and/or water. Applicator 40 is a device for the expulsion of blast media from vapor blast system 10. In one non-limiting embodiment, applicator 40 can be a blast nozzle or blast nozzle extension with a trigger device for opening and closing applicator 40.

Compressor 12 is fluidly connected to air supply line 14. Air supply line 14 extends from compressor 12. System line 16 extends from air supply line 14 to water pump 20. Manifold 18 connects air supply line 14 to blast line 38. Water pump 20 is also connected to pumped water line 26A.

Water regulator 22 is connected to pumped water lines 26A and 26B. Water inlet line 24 is fluidly connected to water pump 20.

Pumped water line 26A is fluidly connected to water pump 20 and water regulator 22. Pumped water line 26B is fluidly connected to water regulator 22 and selector valve 28. Selector valve 28 is fluidly connected to accessory line 32, to water regulator 22 via pumped water line 26B, and to pressure vessel 34 via pressurizing line 30. Pressurizing line 30 and accessory line 32 extend from selector valve 28. Pressurizing line 30 extends from selector valve 28 to pressure vessel 34. Accessory line 32 extends to an accessory, such as a rinse hose. Pressure vessel 34 is fluidly connected to selector valve 28 via pressurizing line 30 and to manifold 18 via media line 36. Media line 36 extends from pressure vessel 34 and intersects manifold 18. Blast line 38 extends from manifold 18 to applicator 40. Applicator 40 is fluidly connected to manifold 18 via blast line 38.

Compressor 12 provides compressed air to air supply line 14. A blasting air portion of the compressed air flows through air supply line 14 and manifold 18, downstream past the intersection of manifold 18 and media line 36, and through blast line 38 to applicator 40. A system air portion of the compressed air flows through air supply line 14 and system line 16 and is provided to water pump 20. Water pump 20 draws water from a water source (not shown) through water inlet line 24 and drives the pumped water flow downstream through pumped water line 26A. The pumped water is driven through water regulator 22 and continues downstream through pumped water line 26B and to selector valve 28. While water regulator 22 is shown downstream of water pump 20, in other non-limiting embodiments water regulator 22 can be at any desired position downstream of water pump 20 and before pressure vessel 34, such as on pumped water lines 26A and 26B between water pump 20 and selector valve 28 or on pressurizing line 30 downstream of selector valve 28.

Water regulator 22 regulates a water pressure of any water pumped downstream of water pump 20 through water regulator 22. As such, water pump 20 draws water through water inlet line 24 and pumps the pumped water downstream at a pumped water pressure higher than a maximum blast air pressure required for vapor blast system 10 operation. Water regulator 22 generates a regulated water flow, having a fixed water pressure, such that a pressure downstream of water regulator 22 is fixed. The regulated water flow moves downstream from water regulator 22 through pumped water line 26B to selector valve 28. Selector valve 28 directs the regulated water to pressurizing line 30 and accessory line 32. Accessory line 32 provides the regulated water to an accessory, such as a rinse hose. Pressurizing line 30 provides the regulated water to pressure vessel 34.

Pressure vessel 34 contains a blast mixture, comprised of blast media and water, which is applied to a substrate to remove a coating from the substrate and to condition the substrate for future coating applications. The media may be of any suitably abrasive material such as, crushed glass, garnet, or any other heavier-than-water particulate, and may be applied to any desired substrate, such as wood, concrete, and steel, to clean or abrade the substrate.

The regulated water enters pressure vessel 34 through pressurizing line 30. Because the regulated water has the fixed water pressure, flowing the regulated water to pressure vessel 34 maintains a fixed pot pressure within pressure vessel 34. When applicator 40 is triggered, the blast mixture disposed within pressure vessel 34 exits pressure vessel 34 through media line 36, and flows through media line 36 to manifold 18. The blast mixture enters manifold 18 and is combined with the blast air portion in manifold 18 to generate an applicator flow. The blast air portion carries the blast mixture downstream to blast line 38, and downstream through blast line 38 to applicator 40. The applicator flow is then accelerated through applicator 40, such as by flowing the mixture through a blast nozzle, and applied to a substrate. The media impacts the substrate and is configured to remove material, such as paint, from the substrate and to condition the substrate for subsequent application of material to the substrate.

During operation, blast media and water are loaded into pressure vessel 34 to generate the blast mixture, and pressure vessel 34 is sealed. Compressor 12 is activated and the system portion of compressed air flows to water pump 20 through air supply line 14 and system line 16 to power water pump 20. With water pump 20 powered, water pump 20 drives the pumped water downstream through pumped water line 26A and water regulator 22. Water regulator 22 then outputs the regulated water flow. The regulated water flow moves downstream to selector valve 28, and selector valve 28 directs the regulated water flow through pressurizing line 30 and into pressure vessel 34. Because the regulated water flow has a fixed water pressure, the fixed water pressure pressurizes pressure vessel 34 to a fixed pot pressure, with the fixed pot pressure being controlled by the fixed water pressure.

With pressure vessel 34 loaded and pressurized, applicator 40 is triggered and air supply line 14 is able to provide the blast air portion of compressed air to manifold 18. Because the fixed pot pressure is greater than the maximum blast air pressure, the blast mixture exits pressure vessel 34 through media line 36 and flows to manifold 18. In addition to opening air supply line 14, triggering applicator 40 causes media line 36 to open such that the blast mixture may flow from pressure vessel 34 and to manifold 18 through media line 36. A pressure differential between the blast air portion flowing through manifold 18 and the fixed pot pressure causes the blast media and water mixture to flow from pressure vessel 34 and into manifold 18.

Additional details of vapor blast systems can be found in co-pending PCT International Application No. PCT/US16/42585 filed on Jul. 15, 2016, which is herein incorporated by reference in its entirety.

Figures 2A, 2B:
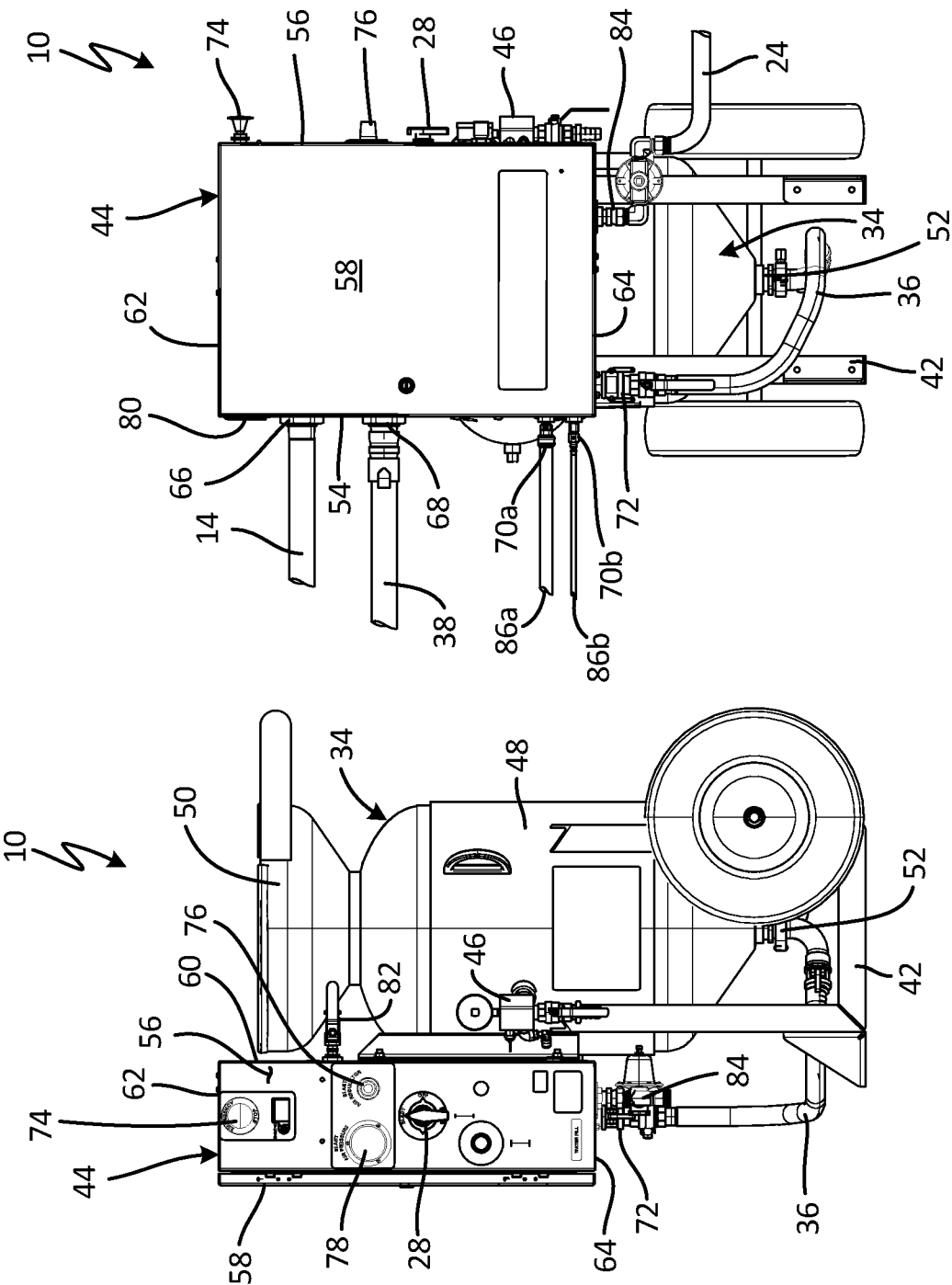
FIG. 2A is a side view of the vapor blast system.
FIG. 2B is a front view of the vapor blast system.

FIG. 2A shows a side view of vapor blast system 10. FIG. 2B shows a front view of vapor blast system 10. FIGS. 2A and 2B are substantially similar and will be discussed in unison. Vapor blast system 10 includes air supply line 14, water inlet line 24, pressure vessel 34, media line 36, blast line 38, frame 42, enclosure 44, and pot pressure gauge 46. Pressure vessel 34 includes pressure pot 48 and fill inlet 50. Pressure pot 48 includes media outlet port 52. Enclosure 44 includes first side 54, second side 56, front 58, back 60, top 62, and bottom 64. Vapor blast system 10 further includes selector valve 28, air inlet port 66, blast outlet port 68, control ports 70a and 70b, media inlet port 72, disconnect 74, blast air control 76, blast pressure gauge 78, inlet air pressure gauge 80, accessory outlet port 82, water inlet port 84, control line 86a and control line 86b.

Frame 42 is a rigid structure of solid material, such as metal. Enclosure 44 is a housing. Pot pressure gauge 46 is a gauge for measuring and displaying pressure. Pressure pot 48 is a pressurized container. Fill inlet 50 is a funnel shaped tube. Media outlet port 52 is a ring-shaped outlet conduit. First side 54 and second side 56 are sides of enclosure 44. Front 58, back 60, top 62, and bottom 64 are side-faces of enclosure 44. Air inlet port 66 and blast outlet port 68 are ring-shaped conduits. Control ports 70a and 70b are outlet conduits. Media inlet port 72 is an inlet conduit. Disconnect 74 is a knob. Blast air control 76 is a depressible button. Blast pressure gauge 78 and inlet air pressure gauge 80 are gauges for measuring and displaying pressure. Accessory outlet port 82 is an outlet conduit. Water inlet port 84 is an inlet conduit configured for the transmission of water. Control line 86a and control line 86b are hoses or conduits configured for transfer of a fluid such as air and/or water.

Air supply line 14 is connected to air inlet port 66 to provide compressed air to enclosure 44. Pressure vessel 34 and enclosure 44 are mounted to frame 42. Blast line 38 is connected to blast outlet port 68, which extends from first side 54 of enclosure, and is configured to receive an applicator flow from enclosure 44. Fill inlet 50 extends from a top of pressure pot 48. Media inlet port 72 extends into enclosure 44 and is configured to receive a blast mixture flow from media line 36. Media line 36 extends between media outlet port 52 and media inlet port 72 and connects pressure vessel 34 and enclosure 44. Pot pressure gauge 46 is disposed between pressure vessel 34 and enclosure 44. The regulated water flows through pot pressure gauge 46 between enclosure 44 and pressure vessel 34. Air inlet port 66 extends through first side 54 of enclosure 44. Inlet air pressure gauge 80 extends through first side 54 of enclosure 44 and is configured to provide a reading of the inlet air pressure entering enclosure 44 through air inlet port 66. Accessory outlet port 82 extends from back 60 of enclosure 44 and is configured to receive an accessory hose. Water inlet port 84 extends from bottom 64 of enclosure 44, and water inlet line 24 connects to water inlet port 84.

Control ports 70a and 70b extend from first side 54 of enclosure 44. Control line 86a extends from control port 70a, and control line 86b extends from control port 70b. Control line 86a and control line 86b extend to applicator 40 (shown in FIG. 1) and are normally disconnected. When applicator 40 is triggered, control line 86a is connected to control line 86b to provide compressed air from control line 86a to control line 86b and back to enclosure 44 to actuate vapor blast system 10 between an active state and an idle state. Selector valve 28 extends into second side 56 of enclosure 44 and is configured to direct a regulated water flow through enclosure 44. Disconnect 74 extends through second side 56 of enclosure 44 and is connected to pneumatic lines disposed within enclosure 44. Disconnect 74 is configured to be extended during operation, and may be depressed to disconnect the compressed air flow through enclosure 44, thereby deactivating vapor blast system 10. Blast air control 76 extends through second side 56 of enclosure 44 and is connected to pneumatic lines disposed within enclosure 44 to control the blast air pressure. Blast pressure gauge 78 extends through second side 56 of enclosure 44 and provides a blast air pressure reading to the user.

Pressure pot 48 of pressure vessel 34 is filled with blast media and water through fill inlet 50. Air supply line 14 provides compressed air to the pneumatic lines disposed within enclosure 44. The compressed air enters enclosure 44, and blast air control 76 is utilized to control a blast air portion flow between air inlet port 66 and blast outlet port 68. Before activating vapor blast system 10, the user pulls disconnect 74 to the disengaged position. With disconnect 74 disengaged, the system air portion is able to flow to and power water pump 20. Triggering applicator 40 connects control line 86a extending from control port 70a with control line 86b extending from control port 70b, and control line 86a and control line 86b cause both air supply line 14 and media line 36 to open such that both compressed air and media flow to and through enclosure 44.

Water pump 20 pulls water into enclosure 44 through water inlet line 24 and water inlet port 84. Water pump 20 drives the water downstream through water regulator 22, and water regulator 22 discharges regulated water at a fixed water pressure. The regulated water flows through selector valve 28, which the user sets to direct the regulated water to either pot pressure gauge 46 and then on to pressure pot 48, or to accessory outlet port 82. With vapor blast system 10 in a blast mode, the selector valve 28 is set to direct the regulated water through pot pressure gauge 46 and to pressure pot 48. The regulated water has the fixed water pressure and flows to pressure pot 48 to pressurize pressure pot 48 to a fixed pot pressure.

Pressure pot 48 is initially charged to the fixed pot pressure. The regulated water flows into pressure pot 48 through pot pressure gauge 46, and pot pressure gauge 46 provides a pot pressure reading to the user. The regulated water pressurizes pressure pot 48 to the fixed pot pressure, at a level configured to be above a maximum blast air pressure. The pot pressure reading indicates to the user that pressure pot 48 is pressurized for blasting. While the fixed water pressure is described as being fixed above a maximum blast air pressure, it is understood that water regulator 22 may be set such that any desired fixed water pressure is provided downstream of water regulator 22. As such, while water regulator 22 is generally set to provide the fixed water pressure prior to a user receiving vapor blast system 10, it is understood that water regulator 22 may be configured to be either fixed before user operation or adjustable by the user.

With media line 36 and manifold 18 open, the pot pressure drops from the fixed pot pressure to a level proximate, though still above, the blast air pressure. A pressure differential between the blast air pressure and the pot pressure causes the blast mixture to flow out of pressure pot 48 through media outlet port 52 and into media line 36. The pressure differential further causes the blast mixture to enter enclosure 44 through media inlet port 72, and to flow into manifold 18 to combine with the blast air portion and form the applicator flow. The applicator flow exits enclosure 44 through blast outlet port 68 and flows through blast line 38 to applicator 40, where the applicator flow is applied to a substrate.

Figure 3:
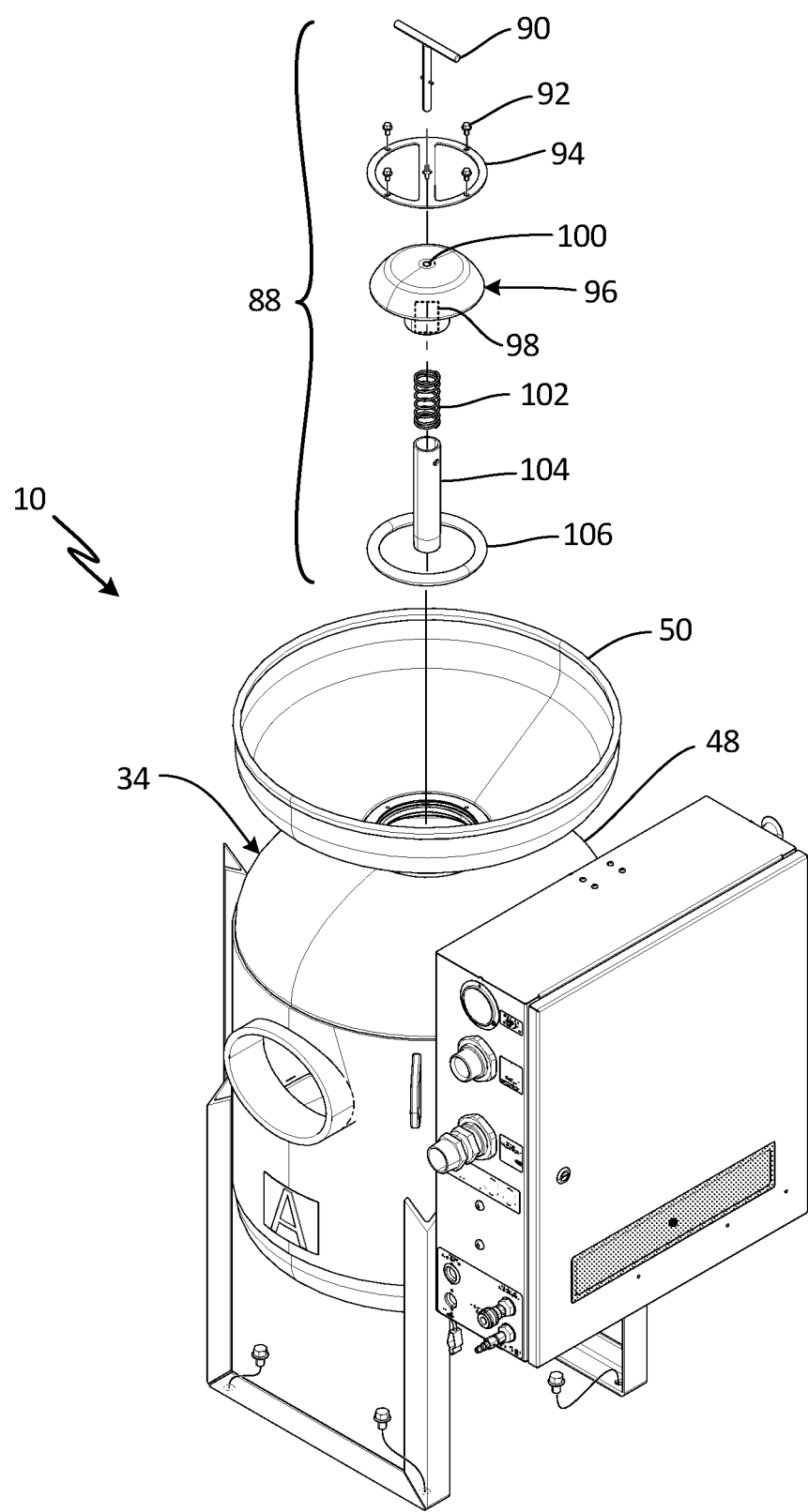
FIG. 3 is a perspective exploded view of the vapor blast system.

FIG. 3 shows a perspective exploded view of vapor blast system 10. In addition to elements discussed with respect to FIGS. 2A and 2B (such as vapor blast system 10, pressure vessel 34, pressure pot 48, and fill inlet 50), FIG. 3 shows seal assembly 88 which includes handle 90, bolts 92, bracket 94, pop-up seal 96 (with bore 98 and blind hole 100), spring 102, pipe 104, and O-ring seal 106.

Seal assembly 88 is an assembly of elements that create a seal for pressure pot 48. Handle 90 is a solid T-shaped device. Bolts 92 are threaded fasteners. Bracket 94 is a ring-shaped member with a cross-beam. Bracket 94 includes a series of holes passing through bracket 94. Pop-up seal 96 is a seal for preventing the passage of a fluid such as water and/or air. In one non-limiting embodiment, a material of pop-up seal 96 can include brass, steel, or aluminum such as a precipitation-hardened aluminum alloy or another aluminum alloy. In another non-limiting embodiment, pop-up seal 96 can be machined, anodized, and/or coated with rubber (see e.g., FIG. 4B) through a transfer mold or press-on process. Bore 98 and blind hole 100 are holes or recesses. Spring 102 is coil-shaped resilient element. Pipe 104 is tube of solid material such as metal. O-ring seal 106 is ring-shaped seal.

When vapor blast system 10 is assembled, seal assembly 88 is disposed in pressure vessel 34. Handle 90 is connected to pop-up seal 96 and extends through and is rotationally engaged with bracket 94. Bolts 92 extend through holes in bracket 94 and rotatably engage with at least one of pressure pot 48 and fill inlet 50 of pressure vessel 34. Bracket 94 is attached to pressure vessel 34 via bolts 92. Pop-up seal 96 is disposed in pressure vessel 34 such that pop-up seal 96 is configured to come into contact with a surface (e.g., O-ring seal 106) of pressure pot 48 to create a seal for preventing fluids from passing into or out of pressure pot 48.

Bore 98 is disposed in a lower surface of pop-up seal 96 and extends partially into pop-up seal 96. Blind hole 100 is disposed in an upper surface of pop-up seal 96 and extends partially into pop-up seal 96. Spring 102 is disposed in bore 98 and is engaged with pipe 104. Spring 102 is biased against pop-up seal 96 and pipe 104. Spring 102 is configured to be depressed upon a user pushing down on handle 90. Pipe 104 fits into bore 98 of pop-up seal 96 and is attached to pressure pot 48. A portion of pipe 104 is received by bore 98. O-ring seal 106 is disposed along and in contact with a bottom side of bracket 94. O-ring seal 106 is snap-fit into a groove of bracket 94, pressure pot 48, or a collar (not shown) of pressure vessel 34. O-ring seal 106 comes into contact with pop-up seal 96 when pop-up seal 96 occupies a closed, or sealed, position.

Seal assembly 88 forms a seal with pressure pot 48 to prevent fluid from entering or exiting pressure vessel 34. Seal assembly 88 is configured to control a flow of a fluid between pressure pot 48 and fill inlet 50. Handle 90 is engaged with bracket 94 such that bracket 94 is able to hold pop-up seal 96 in an open position to allow flow of a fluid past pop-up seal 96. To disengage pop-up seal 96 from O-ring seal 106 (e.g., open pop-up seal 96), handle 90 is aligned with a slot in bracket 94, handle 90 is pushed downwards compressing spring 102, and handle 90 is turned 90° after a pin on handle 90 is below the slot in bracket 94. Proper engagement of the pin of handle 90 will hold pop-up seal 96 down until handle 90 is released from bracket 94. To raise pop-up seal 96 into contact with O-ring seal 106, handle 90 is engaged by pushing down on handle 90, compressing spring 102, turning handle 90° to align the pin of handle 90 with the slot of bracket 94, raising handle 90, passing the pin of handle 90 through the slot of bracket 94, and raising pop-up seal 96 to come into contact with O-ring seal 106.

With pop-up seal 96 being machined, dimensions of pop-up seal 96 have much smaller tolerances than would be produced through a process other than machining, such as casting. The smaller tolerances of pop-up seal 96 allow for more consistent sealing capabilities and flow control of pop-up seal 96. Machining pop-up seal 96 also allows for a consistent spring force by controlling tolerances as compared to a casting process that produces variations in the dimensions such as surface thickness. Machining pop-up seal 96 further allows for a reduction in roughness and porosity, which are typical problems of other process such as casting. With the material of pop-up seal 96 including aluminum, rusting of pop-up seal 96 is prevented (i.e., aluminum does not rust) which allows for a more consistent sealing interface between pop-up seal 96 and O-ring seal 106.

Figure 4A:
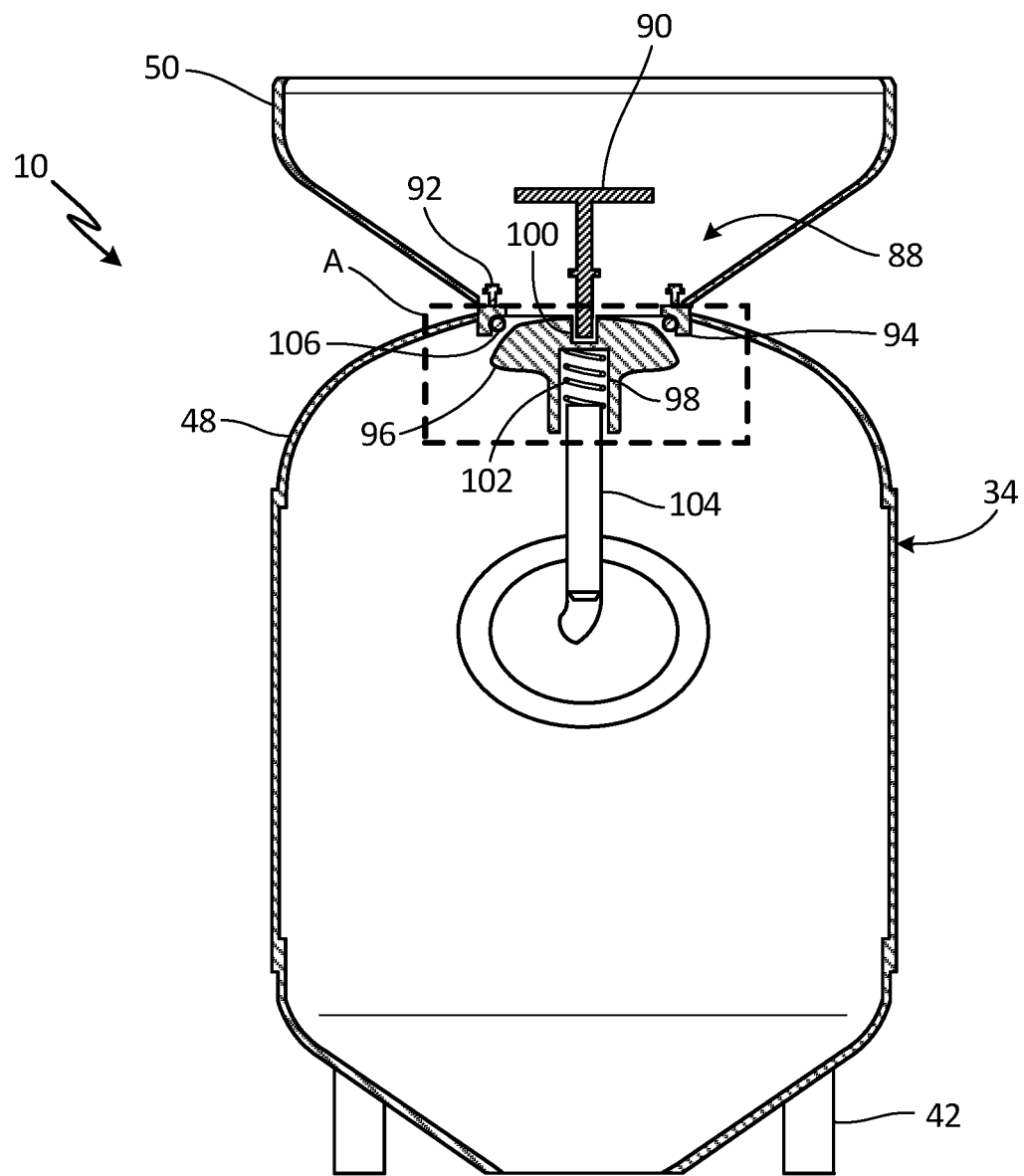
FIG. 4A is a cross-section view of a pressure pot and a pop-up seal of the vapor blast system.
Figure 4B:
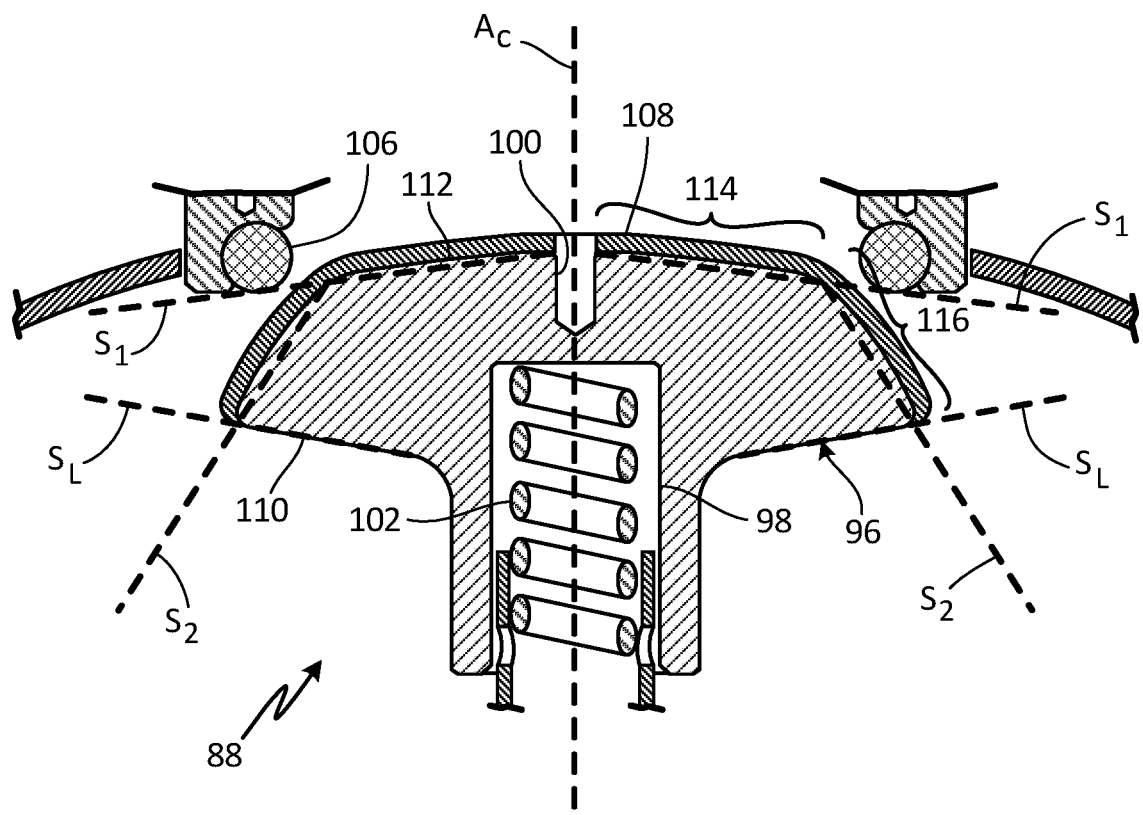
FIG. 4B is an enlarged cross-section view of the pressure pot and pop-up seal designated by box A in FIG. 4A.

FIG. 4A shows a cross-section view of pressure pot 48 and seal assembly 88. FIG. 4B shows an enlarged partial cross-section view of pressure pot 48 and seal assembly 88 designated by box A in FIG. 4A. FIGS. 4A and 4B are substantially similar and will be discussed in unison. FIG. 4A shows pressure vessel 34, frame 42, pressure pot 48, fill inlet 50, and seal assembly 88 (with handle 90, bolts 92, bracket 94, pop-up seal 96 including bore 98 and blind hole 100, spring 102, pipe 104, and O-ring seal 106). In addition to elements discussed with respect to FIGS. 3 and 4A, FIG. 4B shows centerline axis $A_C$, rubber coating 108 and pop-up seal 96 as including lower surface 110 (with slope $S_L$) and upper surface 112 with first radially inner portion 114 (including first average slope $S_1$) and second radially outer portion 116 (including second average slope $S_2$). Handle 90 is omitted from FIG. 4B for clarity.

Centerline axis $A_C$ is an axis passing through a radial center-point of pop-sup seal 96. Rubber coating 108 is a coating made of rubber such as neoprene. Lower surface 110 is a surface of pop-up seal 96 disposed on an under or lower side of pop-up seal 96 (e.g., towards the bottom of pop-up seal 96 as shown in FIGS. 4A and 4B). Slope $S_L$ is a slope of lower surface 110 defined by a line drawn from a radially inner endpoint of lower surface 110 and extending through a radially outer endpoint of lower surface 110.

Upper surface 112 is a surface of pop-up seal 96 disposed on an upper or top side of pop-up seal 96 (e.g., towards the top of pop-up seal 96 as shown in FIGS. 4A and 4B). First radially inner portion 114 is a radially inward portion of upper surface 112 of pop-up seal 96. First average slope $S_1$ is a slope of first radially inner portion 114 defined by a line drawn from a radially inner endpoint of first radially inner portion 114 and extending through a radially outer endpoint of first radially inner portion 114. Second radially outer portion 116 is a radially outward portion of upper surface 112 of pop-up seal 96. Second average slope $S_2$ is a slope of second radially outer portion 116 defined by a line drawn from a radially inner endpoint of second radially outer portion 116 and extending through a radially outer endpoint of second radially outer portion 116.

Bore 98 is disposed in lower surface 110 and extends into a portion of pop-up seal 96 along lower surface 110. In one non-limiting embodiment, bore 98 extends partially (but not entirely) through pop-up seal 96 (e.g., bore 98 does not extend to fluidly connect with blind hole 100.) Blind hole 100 includes a cutout disposed in upper surface 112 and that extends into a portion of pop-up seal 96 along upper surface 112. In one non-limiting embodiment, blind hole 100 extends partially (but not entirely) through pop-up seal 96 (e.g., blind hole 100 does not extend to fluidly connect with bore 98.) The cut-out of blind hole 100 is configured to receive a portion of handle 90 (not shown in FIG. 4B).

Spring 102 is disposed in bore 98 and is engaged (e.g., attached) with pipe 104. Pipe 104 is attached to lower surface 110 of pop-up seal 96. O-ring seal 106 is snap-fit into a groove of bracket 94, pressure pot 48, or a collar (not shown) of pressure vessel 34. Rubber coating 108 covers upper surface 112 of pop-up seal 96. In one non-limiting embodiment, rubber coating 108 is applied to pop-up seal 96 with a transfer mold or press-on process. In another non-limiting embodiment, rubber coating 108 can extend along a portion of lower surface 110 of pop-up seal 96.

Lower surface 110 extends radially between bore 98 and an outer circumference of pop-up seal 96. Lower surface 110 is disposed opposite upper surface 112 and includes a frustoconical configuration with an upward slope relative to centerline axis $A_C$ of pop-up seal 96. Slope $S_L$ is an upward slope relative to centerline axis $A_C$ of pop-up seal 96. Upper surface 112 extends radially between blind hole 100 and the outer circumference of pop-up seal 96. First radially inner portion 114 is disposed between blind hole 100 and second radially outer portion 116. First average slope $S_1$ is set at a first angle relative to centerline axis $A_C$. Second radially outer portion 116 is disposed between first radially inner portion 114 and the outer circumference of pop-up seal 96. Second average slope $S_2$ is set at a second angle to centerline axis $A_C$ that is different than first average slope $S_1$. In one non-limiting embodiment, second average slope $S_2$ is greater than first average slope $S_1$.

Seal assembly 88 functions to form a seal and close pressure pot 48 in order to prevent or allow passage of fluids past pop-up seal 96. As discussed with respect to FIG. 3, pop-up seal 96 can be held in an open position which allows pressure pot 48 to be filled with blast media and water. As blast media and water is poured into fill inlet 50, the blast media and water funnels down to the bottom of fill inlet 50, past pop-up seal 96 (when held in an open position), and into pressure pot 48. As the blast media and water funnel to the bottom of fill inlet 50, the blast media and water come into contact with upper surface 112 of pop-up seal 96. As the blast media and water come into contact with upper surface 112 of pop-up seal 96, the blast media and water pass along first radially inner portion 114 and second radially outer portion 116. With second slope $S_2$ being different than first slope $S_1$ (e.g., second radially outer portion 116 slopes away from centerline axis $A_C$ more than first radially inner portion 114), the blast media and water pass across second radially outer portion 116 at a faster rate than across first radially inner portion 114.

As pressure pot 48 is being filled with the blast media and water, air inside of pressure pot 48 is forced passed pop-up seal 96 and out of pressure pot 48. As the air passes across pop-up seal 96, the air comes into contact with lower surface 110 of pop-up seal 96. As the air comes into contact with lower surface 110 of pop-up seal 96, slope $S_L$ of lower surface 110 enables the air to pass across lower surface 110 without becoming trapped or held up by any portion of lower surface 110. In existing configurations, lower surfaces of pop-up seals typically include a concave region which traps a portion of the air escaping from the pressure pot (e.g., concave regions in the pop-up seal can be a product of a casting process). This trapped air can cause fluctuations in the pressure of the fluid exiting the blast nozzle which alters the amount of blast pressure and negatively affects the consistency of the blast media being sprayed from the blast nozzle. The elimination of air in pressure pot 48 as pressure pot 48 is being filled with blast media and water creates a more stable pressure within pressure pot 48 resulting in a more stable blast.

The downward sloping upper surface 112 of pop-up seal 96 allows for better flow of blast media and water past pop-up seal 96, which increases a fill speed of pressure pot 48. The upward sloping lower surface 110 of pop-up seal 96 eliminates air from being trapped in pressure pot 48 as pressure pot 48 is being filled, as compared to existing pop-up seals with cavities that collect and trap air. Blind hole 100 in pop-up seal 96 provides a consistent mount for handle 90 to control the opening and closing of pop-up seal 96 as well as reduces the number of leak points in pop-up seal 96. Rubber coating 108 absorbs the impact from the blast media and prevents the blast media from coming into contact with upper surface 112 of pop-up seal 96, which prevents the blast media from damaging, abrading, and/or corroding pop-up seal 96. Rubber coating 108 increases durability and longevity of pop-up seal 96 and creates a more consistent sealing interface between pop-up seal 96 and O-ring seal 106.

Figure 5:
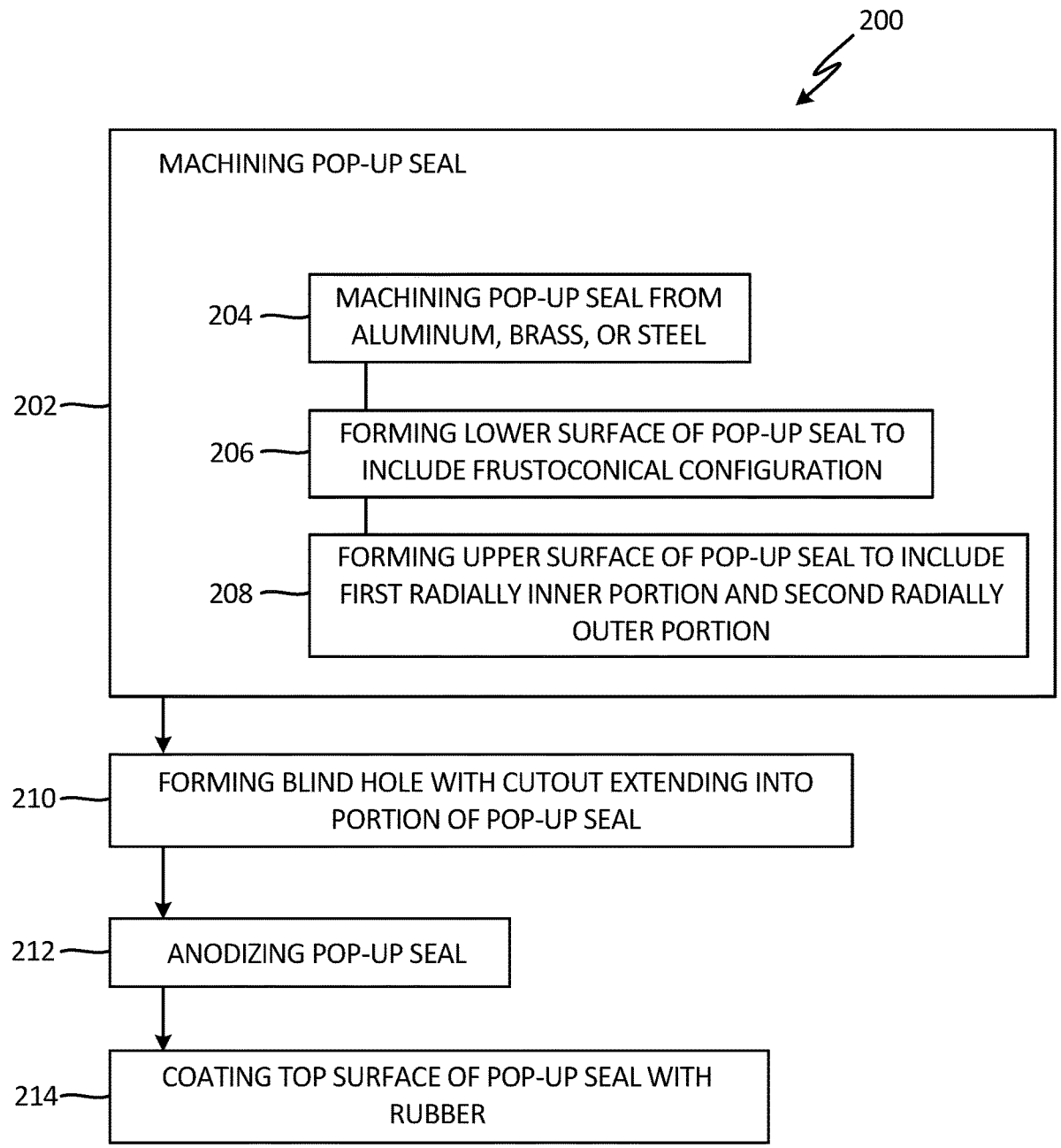
FIG. 5 is a flowchart of a method of making a seal assembly of the vapor blast system.

FIG. 5 is a flowchart of method 200 of making a seal assembly of a vapor blast system (e.g., such as seal assembly 88 of vapor blast system 10), which includes steps 202-214.

Step 202 includes machining pop-up seal 96 and steps 204-208. Step 204 includes machining pop-up seal 96 from aluminum, brass, or steel. Step 206 includes forming lower surface 110 of pop-up seal 96 to include a frustoconical configuration. Step 208 includes forming upper surface 112 of pop-up seal 96 to include first radially inner portion 114 and second radially outer portion 116. Step 210 includes forming blind hole 100 with a cutout extending into a portion of pop-up seal 96. Step 212 includes anodizing pop-up seal 96. Step 214 includes coating upper surface 112 of pop-up seal 96 with rubber coating 108. Rubber coating 108 can be applied with a transfer mold process.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A vapor blast system comprising:
   a pressure pot with an upper end and a main body;
   a fill inlet attached to the upper end of the pressure pot; and
   a seal assembly disposed in the pressure pot, the seal assembly configured to control a flow of a fluid between the pressure pot and the fill inlet, the seal assembly comprising:
      a pop-up seal comprising:
         a body;
         an upper surface;
         a lower surface disposed opposite the upper surface;
         a blind hole disposed in the upper surface;
         a bore disposed in the lower surface; and
         a centerline axis disposed through a center of the pop-up seal;
      a pipe attached to a lower surface of the pop-up seal, wherein a portion of the pipe is received by the bore; and
      a spring disposed in the bore and engaged with the pipe.

2. The vapor blast system of claim 1 and further comprising a rubber coating disposed on the upper surface of the pop-up seal.

3. The vapor blast system of claim 2, wherein the rubber coating comprises neoprene applied by a transfer mold process.

4. The vapor blast system of claim 1, wherein the lower surface of the pop-up seal comprises a frustoconical configuration with an upward slope relative to the centerline axis of the pop-up seal.

5. The vapor blast system of claim 1, wherein the upper surface of the pop-up seal comprises:
   a first radially inner portion comprising a first average slope relative to the centerline axis of the pop-up seal; and
   a second radially outer portion comprising a second average slope relative to the centerline axis of the pop-up seal, wherein the second average slope is different than the first average slope.

6. The vapor blast system of claim 1, wherein a material of the pop-up seal comprises aluminum, brass, or steel.

7. The vapor blast system of claim 1, wherein the pop-up seal is formed by machining.

8. The vapor blast system of claim 1, wherein the blind hole comprises a cutout extending into a portion of the pop-up seal, wherein the cutout is configured to receive a portion of a handle.

9. A method of making a seal assembly for use in a pressure pot of a vapor deposition system, the method comprising:
 machining a pop-up seal, the pop-up seal comprising:
  a centerline axis:
  a body;
  a blind hole disposed in the body, the blind hole with a cutout;
  an upper surface with a first radially inner portion comprising a first average slope relative to the centerline axis of the pop-up seal and a second radially outer portion comprising a second average slope relative to the centerline axis of the pop-up seal, wherein the second average slope is greater than the first average slope;
  a lower surface including a frustoconical configuration with an upward slope relative to the centerline axis of the pop-up seal; and
 coating the upper surface of the pop-up seal with a rubber coating.

10. The method of claim 9 and further comprising anodizing the pop-up seal.

11. The method of claim 9, wherein coating the upper surface of the pop-up seal comprises applying the rubber coating with a transfer mold process.

12. The method of claim 9, wherein machining the pop-up seal further comprises forming the blind hole with the cutout extending into a portion of the pop-up seal, wherein the cutout is configured to receive a portion of a handle.

13. The method of claim 9, wherein machining the pop-up seal further comprises machining the pop-up seal from a piece of aluminum, brass, or steel.

14. A seal assembly comprising:
 a pop-up seal formed of machined aluminum, brass, or steel, the pop-up seal comprising:
  a body;
  an upper surface;
  a lower surface disposed opposite the upper surface;
  a blind hole disposed in the upper surface, wherein the blind hole comprises a cutout extending into a portion of the pop-up seal;
  a bore disposed in the lower surface; and
  a centerline axis disposed through a center of the pop-up seal;
 a rubber coating disposed on the upper surface of the pop-up seal;
 a pipe attached to the pop-up seal, wherein a portion of the pipe extends into the bore; and
 a spring disposed in the bore and engaged with the pipe.

15. The seal assembly of claim 14, wherein the lower surface of the pop-up seal comprises a frustoconical configuration with an upward slope relative to the centerline axis of the pop-up seal, and further wherein the upper surface of the pop-up seal comprises:
 a first radially inner portion comprising a first average slope relative to the centerline axis of the pop-up seal; and
 a second radially outer portion comprising a second average slope relative to the centerline axis of the pop-up seal, wherein the second average slope is greater than the first average slope.

16. The seal assembly of claim 14, wherein the rubber coating comprises neoprene applied by a transfer mold process.

17. The seal assembly of claim 14, wherein the cutout is configured to receive a portion of a handle.

18. A pop-up seal comprising:
 a body formed of machined aluminum, brass, or steel;
 a centerline axis disposed through a center of the pop-up seal;
 an upper surface comprising:
  a first radially inner portion comprising a first average slope relative to the centerline axis of the pop-up seal; and
  a second radially outer portion comprising a second average slope relative to the centerline axis of the pop-up seal, wherein the second average slope is different than the first average slope;
 a lower surface disposed opposite the upper surface, wherein the lower surface of the pop-up seal comprises a frustoconical configuration with an upward slope relative to the centerline axis of the pop-up seal;
 a blind hole disposed in the upper surface, wherein the blind hole comprises a cutout extending into a portion of the pop-up seal, wherein the cutout is configured to receive a portion of a handle; and
 a bore disposed in the lower surface.

19. The pop-up seal of claim 18 and further comprising a neoprene rubber coating applied by a transfer mold process to the upper surface of the pop-up seal.

\* \* \* \* \*